United States Patent
Ikeda et al.

[11] Patent Number: 5,953,456
[45] Date of Patent: *Sep. 14, 1999

[54] RECORDING APPARATUS FOR REPETITIVELY RECORDING IMAGE DATA OF SAME FRAME AND REPRODUCING APPARATUS

[75] Inventors: Shingo Ikeda, Tama; Shingo Nozawa, Tokyo, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/708,635

[22] Filed: Sep. 5, 1996

[30] Foreign Application Priority Data

| Sep. 5, 1995 | [JP] | Japan | 7-227842 |
| Sep. 22, 1995 | [JP] | Japan | 7-244851 |
| Jan. 12, 1996 | [JP] | Japan | 8-003597 |
| Mar. 1, 1996 | [JP] | Japan | 8-044951 |

[51] Int. Cl.⁶ ................................. H04N 1/41
[52] U.S. Cl. ................. 382/232; 382/233; 382/239; 382/246; 358/426; 358/261.4; 358/453; 358/444; 358/468; 358/434; 358/448; 358/438
[58] Field of Search ................. 358/426, 432, 358/433, 261.4, 261.3, 261.2, 427, 467, 453, 434, 435, 438, 296; 395/114; 382/239, 236, 235, 250, 246, 243, 248, 233; 348/405, 408, 415; 341/50

[56] References Cited

U.S. PATENT DOCUMENTS

| 5,057,940 | 10/1991 | Murakami et al. | 358/467 |
| 5,073,821 | 12/1991 | Juri | 348/405 |
| 5,291,282 | 3/1994 | Nakagawa et al. | 348/415 |
| 5,335,016 | 8/1994 | Nakagawa et al. | 348/405 |
| 5,337,049 | 8/1994 | Shimoda | 341/50 |
| 5,384,849 | 1/1995 | Jeong | 382/248 |
| 5,485,213 | 1/1996 | Murashita et al. | 348/415 |
| 5,563,661 | 10/1996 | Takahashi et al. | 348/390 |
| 5,568,278 | 10/1996 | Nakano et al. | 358/433 |
| 5,588,075 | 12/1996 | Chiba et al. | 358/433 |

*Primary Examiner*—Edward L. Coles
*Assistant Examiner*—Cheukfan Lee
*Attorney, Agent, or Firm*—Fitzpatrick, Cella, Harper & Scinto

[57] ABSTRACT

Image data of one frame stored in a memory is repetitively read a plurality of times as a still image. The read image data is encoded and recorded. In this case, the image data of one frame is divided into a plurality of areas, and the image data is encoded so as to make the image quality of the image data at a particular area be better than that of the image data at the other areas. The particular area in each set of the image data repetitively read is disposed differently. A still image of high quality can be therefore obtained.

35 Claims, 15 Drawing Sheets

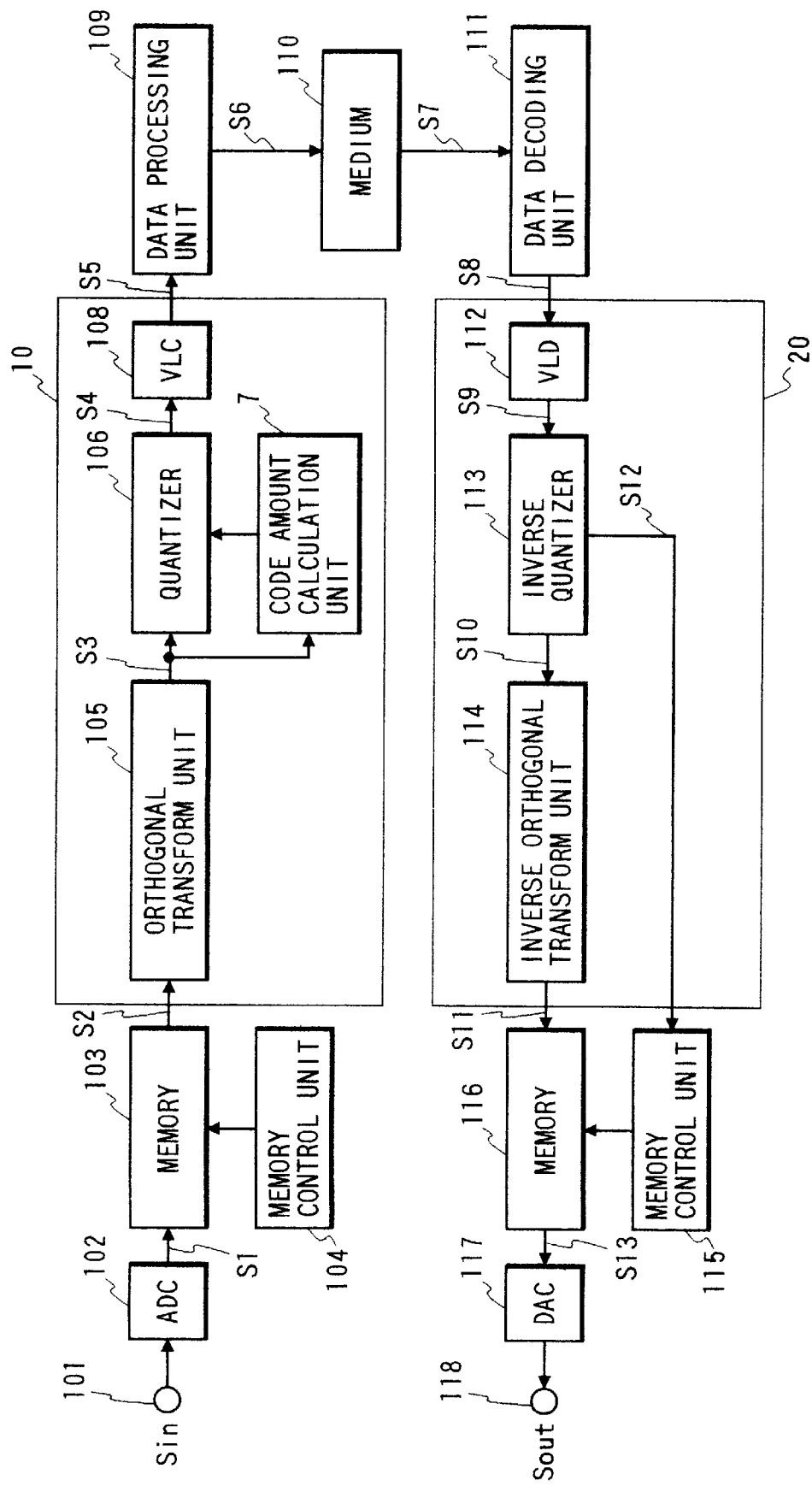

I = 1   I = 2   I = 3       I = N

8 PIXELS
8 PIXELS

FIG. 7A
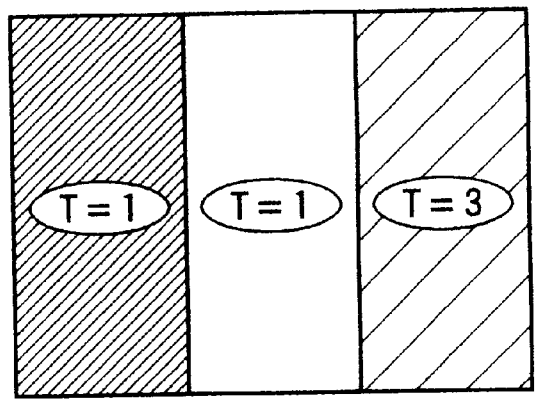
FIG. 7B
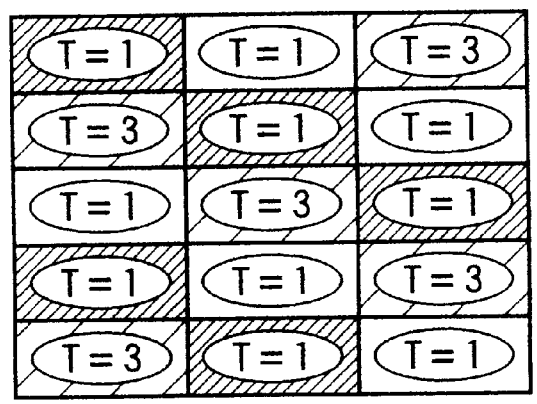
FIG. 9
| Y1 | Y2 | Y3 | Y4 | C1 | C2 |

RECORDING APPARATUS FOR REPETITIVELY RECORDING IMAGE DATA OF SAME FRAME AND REPRODUCING APPARATUS

BACKGROUND OF THE INVENTION

1. Field of the Invention

The present invention relates to recording and reproducing of image data, and more particularly to recording and reproducing encoded image data.

2. Related Background Art

In a conventional apparatus of this type, image data is divided into blocks each having a plurality of pixels, data of each block is orthogonally transformed, the orthogonally transformed data is quantized and variable-length encoded so as for the orthogonally transformed data of all the plurality of blocks to have a predetermined code amount, and the quantized and encoded data is transmitted or recorded.

In some cases, not only a moving image but also a still image is transmitted or recorded.

In recording a still image, image data of one frame is stored in a memory and repetitively read therefrom to divide it into blocks, orthogonally transform, quantize, encode, transmit, and record it.

The visual characteristics of human eyes find degraded image quality of a still image more easily than a moving image. Therefore, if the same data compression scheme, such as block formation, orthogonal transform, quantization, and encoding, is used both for recording a moving image and for recording a still image, the degraded image quality becomes more conspicuous in a still image mode.

For example, a boundary between blocks may be distorted lowering the quality of images and voices.

Degraded image quality of a still image becomes conspicuous, particularly at an edge portion or at a flat portion. In order to obtain a high quality still image, quantization and variable-length coding may be performed at a lower compression factor of a still image than a moving image.

With this method setting a lower compression factor of a still image than a moving image, however, two series of circuits for processing the still and moving images are required, increasing the whole circuit scale.

SUMMARY OF THE INVENTION

It is an object of the present invention to solve the above-described problems.

It is another object of the present invention to prevent the image quality of a still image from being degraded when it is recorded.

According to one aspect of the present invention solving the above objects, there is provided a recording apparatus, comprising: memory means for storing image data of one frame; encoding means for encoding the image data of one frame stored in the memory means by dividing the image data into a plurality of areas; and recording means for recording the image data encoded by the encoding means, wherein the encoding means encodes the image data so as to make the image quality of an image of the image data at a predetermined area among the plurality of areas be better than the other areas.

It is a further object of the present invention to obtain a high quality still image without greatly changing the processes of recording/reproducing a moving image.

The above and other objects and features of the invention will become apparent from the following detailed description of embodiments when read in conjunction with the accompanying drawings.

BRIEF DESCRIPTION OF THE DRAWINGS

FIG. 1 is a block diagram showing the structure of a recording/reproducing apparatus according to an embodiment of the invention.

FIGS. 7A and 7B are diagrams illustrating a reproducing operation by the apparatus shown in FIG. 1.

FIG. 9 shows data processed by the apparatus shown in FIG. 1.

DETAILED DESCRIPTION OF THE PREFERRED EMBODIMENTS

Figure 2A:
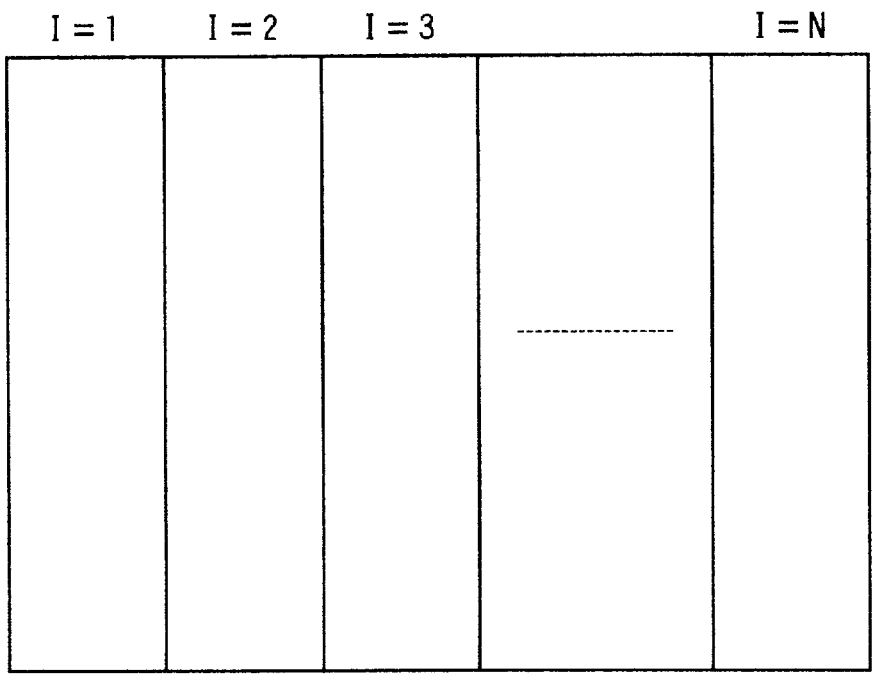
FIGS. 2A and 2B are diagrams illustrating block formation according to the embodiment of the invention.

FIG. 1 is a block diagram showing the structure of an image recording apparatus embodying the present invention.

Referring to FIG. 1, an analog image signal Sin input to an input terminal 101 is first supplied to an A/D converter 102 and converted into a digital image signal S1 which is in turn stored in a memory 103. This memory 103 is controlled by a memory control unit 104 for the designation of a read/write address and the operation of read/write.

Under the read control by the memory control unit 104, image data S2 read from the memory 103 in the unit of blocks to be described later is orthogonally transformed by an orthogonal transform unit 105. In this embodiment, the orthogonal transform unit 5 performs DCT. The orthogonally transformed image data S3 is supplied to a quantizer 106 whereat it is quantized with reference to a selected quantizing table.

The orthogonally transformed image data S3 is also supplied to a code amount calculation unit 107. This code amount calculation unit 107 calculates quantizing coefficients by using the image data supplied from the orthogonal transform unit 105 and determines a quantizing table. The quantizing coefficients are calculated (hereinafter called "X-block fixed-length encoded") such that the image data quantized and fixed-length encoded in the unit of X (X>1) blocks has a predetermined code amount. The quantizer 106 selects the quantizing table in accordance with the code amount value calculated by the code amount calculation unit 107. Information of the selected quantizing table together with the image data is recorded and reproduced, the result being used by an inverse orthogonal transform unit 113 to be described later.

Image data S4 quantized by the quantizing table determined in the above manner is supplied to a variable length encoder VLC 108 and variable-length encoded. The variable-length encoded image data S5 is supplied to a data processing unit 109. The data processing unit 109 processes the image data S5 to convert it into data of the type suitable for transmission medium or recording medium. The processed data S6 is supplied to a medium 10 as a transmission medium or a recording medium to be transmitted or recorded. The orthogonal transform unit 105, quantizer 106, code amount calculation unit 107, and VLC 108 constitute a compression/encoding unit 10.

Next, the data S7 transmitted via the transmission medium or reproduced from the recording medium is supplied to a data decoding unit 111 which converts the data S7 of the type suitable for the transmission medium or recording medium into data of the type suitable for a reproducing process. The image data S8 processed by the data decoding unit 111 is supplied to a variable-length decoder (VLD) 112. The variable-length decoder 112 decodes the image data S8 into image data S9 which is output to an inverse quantizer unit 113 which inversely quantizes the image data by using the information of the quantization table reproduced together with the image data. The inversely quantized image data S10 is output to the inverse orthogonal transform unit 114.

The inverse orthogonal transform unit 114 inversely and orthogonally transforms the image data S10 into image data S11 which is stored in a memory 116. This memory 116 is controlled by a memory control unit 115 for the designation of a read/write address and the operation of read/write. The quantizing table information used by the inverse quantizer 113 is supplied as data S12 to the memory control unit 115 which operates in accordance with the quantizing table indicated by the data S12. The VLD 112, inverse quantizer 113, and inverse orthogonal transform unit 114 constitute an expansion/decoding unit 20. Under the read control by the memory control unit 115, image data S13 read from the memory 116 is converted into an analog image signal and output as an output image signal Sout from an output terminal 118.

Next, an operation of processing image data according to the embodiment will be described.

Block formation of image data and selection of blocks to be subjected to X-block fixed-length encoding are executed by the memory control unit 104. Block formation is executed as illustrated in FIGS. 2A and 2B.

Figure 2B:
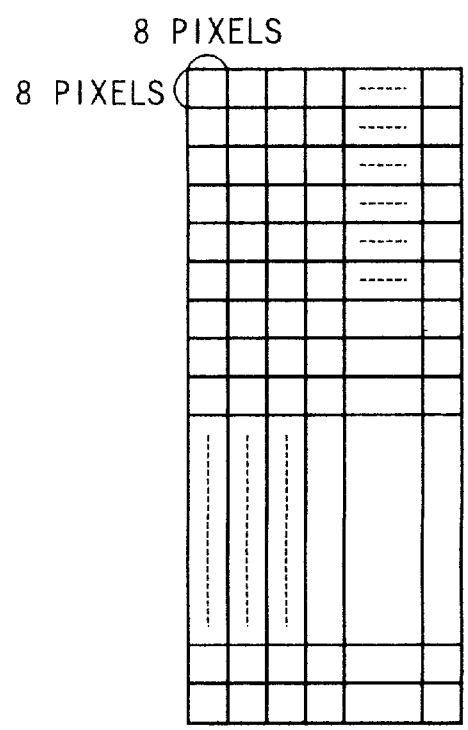

Specifically, for X-block fixed-length encoding, image data of one frame is divided into 1 to N areas as shown in FIG. 2A. Adjacent Y blocks to be orthogonally transformed are selected from 1 to N areas (e.g., each block is constituted of image data of 8 pixels×8 pixels), and quantization and variable-length encoding are executed such that the image data has a predetermined code amount of all blocks of X=Y×N. The quantizing coefficients are given for each set of Y blocks selected from each area (I=1 to N). FIG. 2B shows image data in each area, one block has 8 pixels×8 pixels.

Next, an operation of transmitting or recording a still image will be described. It is assumed that N=3 in FIG. 2A and that image data of one frame stored in the memory 103 is read three times to record it.

Figure 3A:
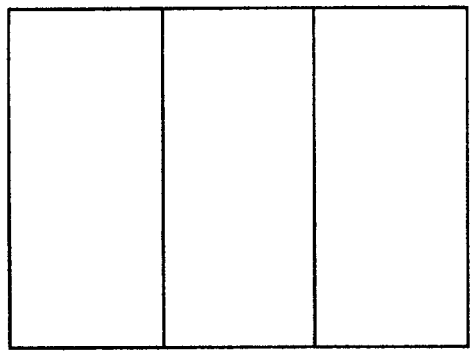
FIGS. 3A to 3D are diagrams illustrating a quantization operation by the apparatus shown in FIG. 1.
Figure 3B:
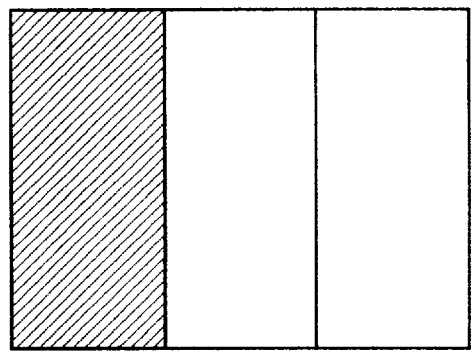
Figure 3C:
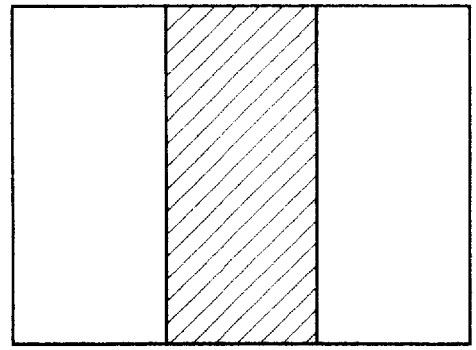
Figure 3D:
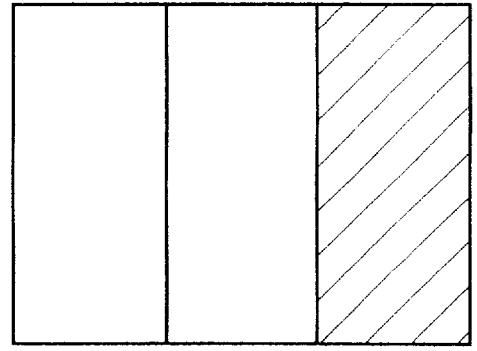

FIG. 3A shows one frame of an image where N=3 with the laterally divided three areas I=1 to 3. For X-block fixed-length encoding (X=N×Y, where Y is an integer of 1 or larger), as described earlier, Y blocks to be orthogonally transformed are selected from each area and are quantized and variable-length encoded so as to have a predetermined code amount. For the image data of a frame recorded or transmitted first time, the quantizing coefficients for the image data in the hatched area (I=1) shown in FIG. 3B are determined such that the image quality of this area becomes better than the other areas (I=2 and 3). For the image data of a frame recorded or transmitted second time, the quantizing coefficients for the image data in the hatched area (I=2) shown in FIG. 3C are determined such that the image quality of this area becomes better than the other areas (I=1 and 3). For the image data of a frame recorded or transmitted third time, the quantizing coefficients for the image data in the hatched area (I=3) shown in FIG. 3D are determined such that the image quality of this area becomes better than the other areas (I=1 and 2).

In the above manner, still image data of the same frame is transmitted or recorded a plurality of times (in this embodiment, three times).

Next, an operation of reproducing a still image recorded or transmitted in the above manner will be described. The image data quantized based on the quantizing characteristics with least degraded image quality is selected from each of the image data of one frame transmitted or recorded a plurality of times. By using such image data, the image data with least degraded image quality can be obtained.

In this embodiment, the memory 116 is controlled by the memory control unit 115 for the address control and read/write operation, and the memory control unit 115 receives the data S12 as the inverse quantization information used by the inverse quantizer 113. Therefore, writing to the memory 116 is controlled in the following manner by using the data S12 as the inverse quantization information. Namely, the inverse quantization information of the image data stored in the memory 116 is compared with the inverse quantization information of the image data newly reproduced, and the image data having less degraded image quality is written in the memory 116.

Figure 4A:
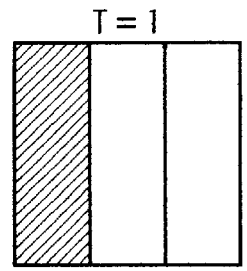
FIGS. 4A to 4D are diagrams illustrating a reproducing operation by the apparatus shown in FIG. 1.
Figure 4B:
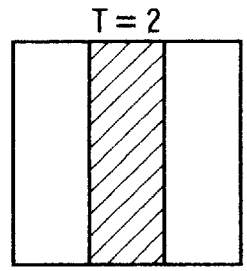
Figure 4C:
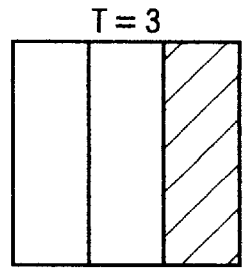
Figure 4D:
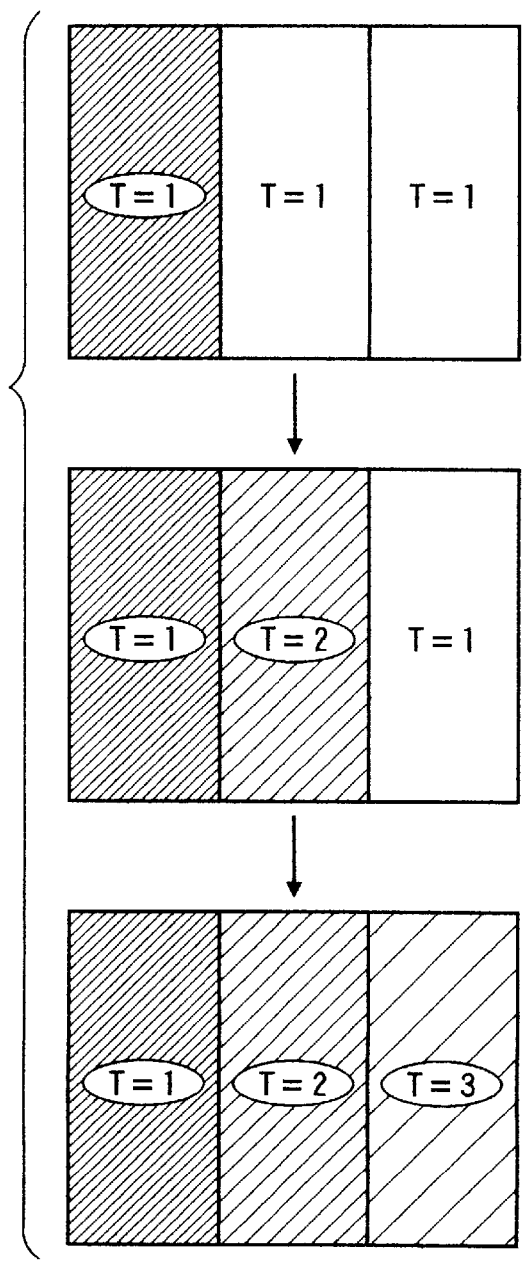

FIGS. 4A to 4C show the state of image data transmitted at consecutive frames T=1 to 3. The hatched area has the quantizing characteristics with less degraded image quality than other areas. FIG. 4D shows the state of image data written in the memory 116. First, the image data S11 obtained by processing the image data of a frame of T=1 is written in the memory 116. The memory control unit 115 then controls to write image data of the succeeding frames T=2 and 3 in the following manner. Specifically, if the image data of the succeeding frame T=2 and 3 at one area quantized based on the quantizing characteristics with less degraded image quality than the image data of the first frame T=1 at the corresponding area already stored in the memory 116, is reproduced, the latter is replaced by the former, and the image data at the other areas is not written. With this control, only the image data quantized based on the quantizing characteristics with less degraded image quality is selected from the consecutive three frames and written in the memory 116 so that image data of less degraded image quality can be obtained as a still image of one frame.

The memory control unit 115 does not perform such control for a moving image, and operates independently from the data S12. By recording and reproducing image data together with data discriminating between a moving image and a still image, the memory control unit 115 can execute its operation matching the type of reproduced image data.

As above, still image data in a particular area is processed so as to have less degraded image quality than a moving image, and the image data of the same frame is transmitted or recorded a plurality of times. During the reproduction, only the image data with less degraded image quality is selected to form one frame image signal. Therefore, it is possible to realize an image processing apparatus capable of transmitting or recording an image signal with less degraded image quality.

Next, another operation of processing image data will be described. In the above embodiment, image data of the same frame is transmitted or recorded a plurality of times by changing the quantizing characteristics as shown in FIGS. 3A to 3D. In this embodiment, the image data is processed as illustrated in FIGS. 5A to 5C.

Figure 5A:
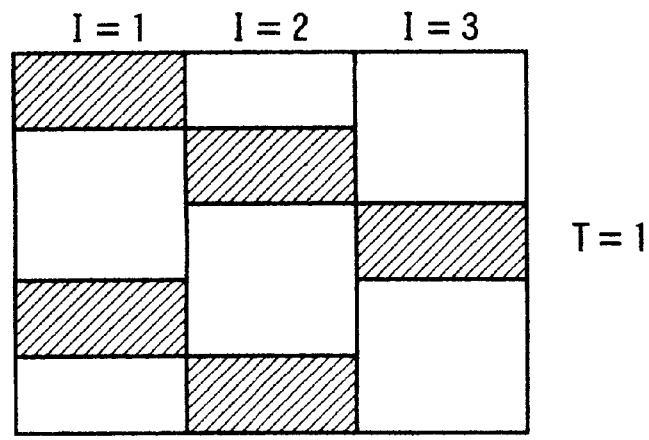
FIGS. 5A to 5C are diagrams illustrating another quantization operation by the apparatus shown in FIG. 1.
Figure 5B:
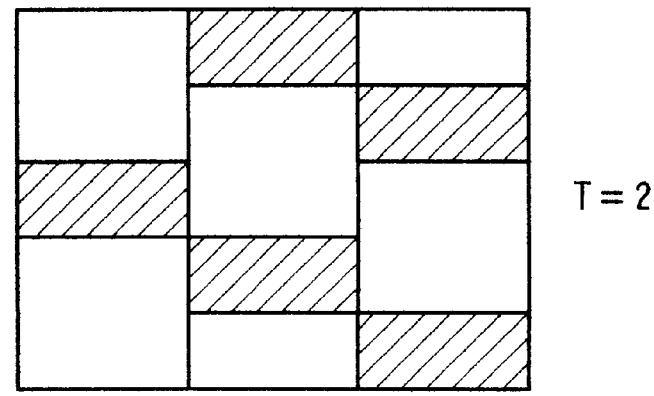
Figure 5C:
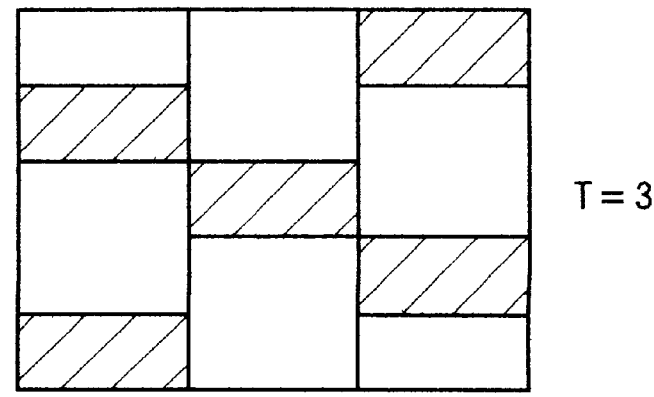

FIG. 5A to 5C show one frame of an image where N=3 with the laterally divided three areas I=1 to 3. For X-block fixed-length encoding (X=N×Y, where Y is an integer of 1 or larger), Y blocks to be orthogonally transformed are selected from each area and are quantized and variable-length encoded so as to have a predetermined code amount. For the image data of a frame recorded or transmitted first time among the image data of the three consecutive frames, the image data in hatched areas shown in FIG. 5A is quantized based on the quantizing characteristics with less degraded image quantity than the other areas. For the image data of a frame recorded or transmitted second time, the image data in the hatched areas shown in FIG. 5B is quantized based on the quantizing characteristics with less degraded image quantity than the other areas. For the image data of a frame recorded or transmitted third time, the image data in the hatched areas shown in FIG. 5C is quantized based on the quantizing characteristics with less degraded image quantity than the other areas.

In this embodiment, areas for which the image data is quantized based on the quantizing characteristics with less degraded image quality than the other areas are selected so that correlation between areas of a frame in the vertical and horizontal directions in the frame is made as low as possible.

For simplicity of description, the hatched areas are formed coarsely. However, in actual implementation, they are formed more finely to make the correlation in the vertical and horizontal directions in the frame as low as possible.

Similar to the embodiment described previously, during the reproduction, of the image data transmitted or recorded a plurality of times, the image data quantized based on the quantizing characteristics with least degraded image quality is selected and output so that image data of one frame with less degraded image quality can be obtained.

Figure 6A:
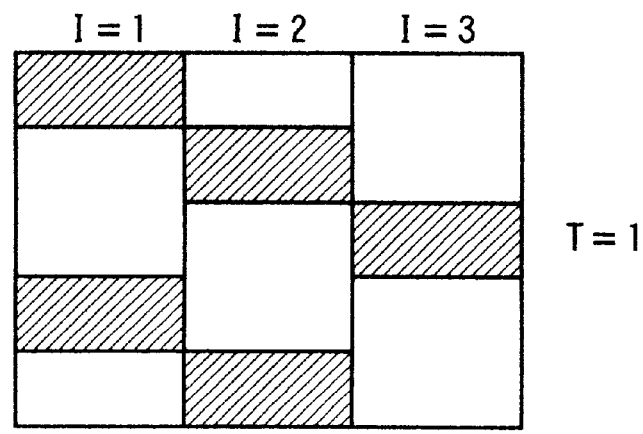
FIGS. 6A to 6C are diagrams illustrating a reproducing operation of the data quantized as shown in FIGS. 5A to 5C.
Figure 6B:
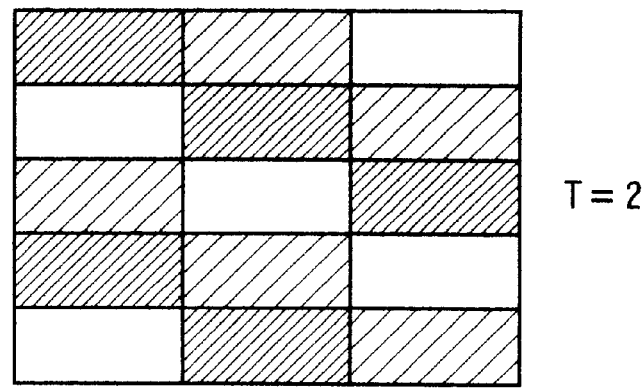
Figure 6C:
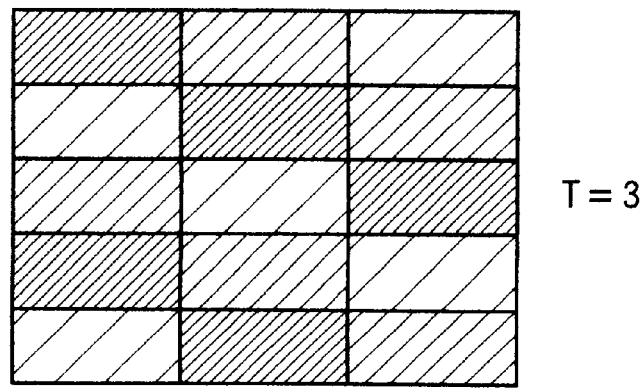

FIGS. 6A to 6C show the state of image data stored in the memory 116. Similar to the embodiment described previously, first, the image data S11 obtained by processing the image data of a frame of T=1 is written in the memory 116. Next, if the image data of one area quantized based on the quantizing characteristics with less degraded image quality than the image data of the first frame T=1 at the corresponding areas already stored in the memory 116, is reproduced, the latter is replaced by the former, and the image data at the other areas is not written. With this control, only the image data of one frame with less degraded image quality can be stored in the memory 116.

As above, still image data at particular areas is processed so as to have less degraded image quality than the other areas, and the image data of the same frame is transmitted or recorded a plurality of times. During the reproduction, only the image data with least degraded image quality is selected to form one frame image signal. In this case, particular areas are selected such that the correlation in the vertical and horizontal directions in the frame becomes as low as possible. Therefore, in addition to the advantageous effects of the embodiment described earlier, the following effects can be obtained.

Even if the reproduced image data contains any error, degradation of a reproduced image can be visually made not conspicuous. For example, consider that an area at T=2 frame has an error. If the areas are determined as shown in FIG. 3A, areas having different image qualities are clearly discriminated as shown in FIG. 7A. However, if the areas are determined as shown in FIGS. 5A to 5C, the areas having different image qualities are disposed with as low a correlation as possible in the vertical and horizontal direction in the frame, so that the areas with different image qualities visually become not conspicuous.

Similarly, even at the midway that storing the image data in the memory 116 is not still completed, the areas with different image qualities can be visually made not conspicuous.

According to the embodiments described so far, in transmitting or recording a still image, a still image with better image quality than a still image processed ordinarily (in the manner similar to when a moving image is recorded), can be obtained.

In the above embodiments, the memory control unit 115 compares the inverse quantization information of the image data already stored in the memory 116 with the inverse quantization information of the newly reproduced image data, and the image data at some area in the memory 116 is replaced by the image data at the same area quantized based on the quantizing characteristics with less degraded image quality than that stored in the memory.

The invention is not limited to the above, but the inverse quantization information of each of a plurality of areas of one frame may be compared, and only the image data with least degraded image quality in each frame may be written in the memory 116.

Figure 8A:
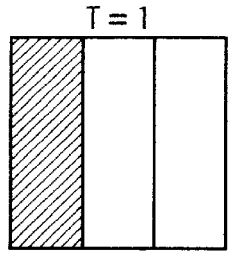
FIGS. 8A to 8F are diagrams illustrating another reproducing operation by the apparatus shown in FIG. 1.
Figure 8B:
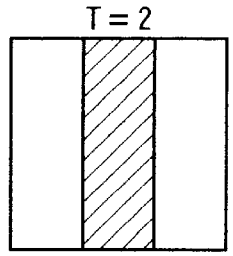
Figure 8C:
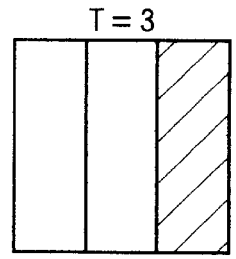

Specifically, as shown in FIGS. 8A to 8C, the image data in each hatched area is quantized based on the quantizing characteristics with least degraded image quality.

Figure 8D:
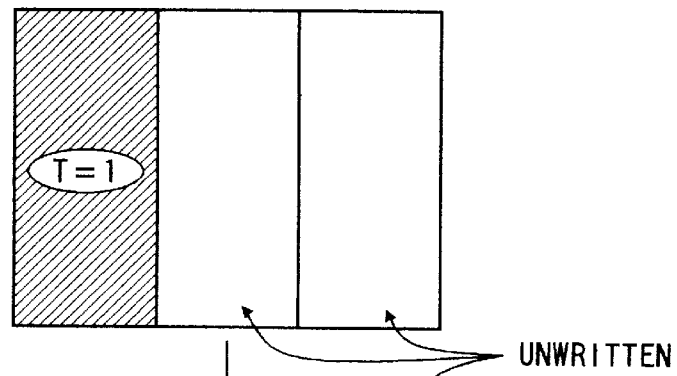

In reproducing these frames, the memory control unit 115 first compares the inverse quantization information of three areas in the first frame T=1, and as shown in FIG. 8D, only the image data at the leftmost area with least degraded image quality is written in the memory 116.

Figure 8E:
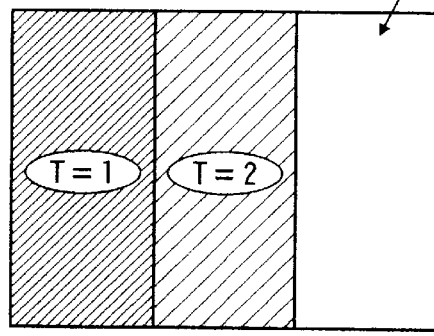
Figure 8F:
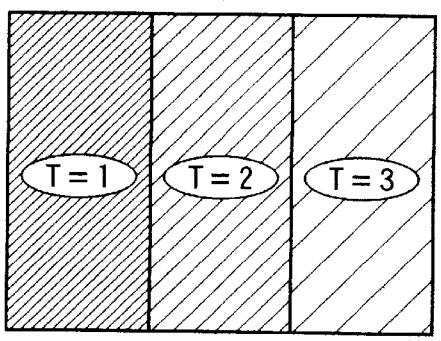

For the frames T=2 and 3, only the image data at the middle area and at the rightmost area is written in the memory 116 as shown in FIGS. 8E and 8F.

Although not specifically described with the above embodiments, if the input image signal is constituted by a luminance signal and a color difference signal, as X blocks selected for X-block fixed-length encoding, a predetermined ratio of luminance signal blocks to color difference signal blocks is set. For example, if a ratio of data of luminance signals and color difference signals in one frame is A:B, as X blocks selected for X-block fixed-length encoding, luminance signal blocks and color difference signal blocks having the ratio A:B are selected.

An operation of the apparatus shown in FIG. 1 will be described assuming that X blocks of luminance and color difference signals are contained.

FIG. 9 shows a state of six blocks selected from the area n(N≧n≧1) shown in FIG. 2A under the condition of Y=6 and A:B=4:2. Y1 to Y4 represent a luminance signal block, and C1 and C2 represent a color difference signal block. The blocks selected as shown in FIG. 9 will be described next.

Figure 10A:
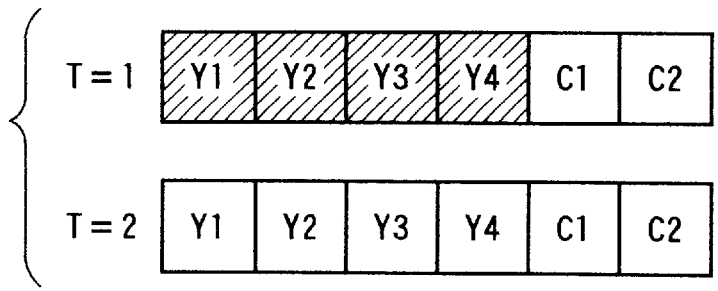
FIGS. 10A to 10C are diagrams illustrating a quantization operation by the apparatus shown in FIG. 1.

In FIGS. 10A to 10C and FIGS. 11A and 11B, hatched blocks are processed by using parameters for changing the quantizing characteristics so as to make the hatched blocks have better image quality than the other blocks. Transmitted or recorded for the frame T=1 shown in FIG. 10A, is data processed by using parameters for changing the quantizing characteristics so as to provide better image quality of luminance signals of the four blocks than color difference signals of the other two blocks. Transmitted or recorded for the frame T=2, is data processed ordinarily (in the manner similar to when a moving image is recorded). In the above manner, two frames or more are transmitted or recorded.

Figure 10B:
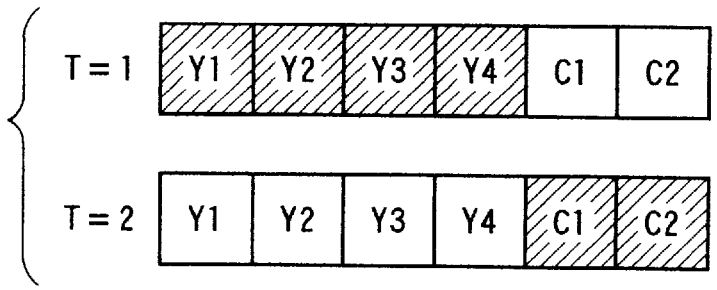

Alternatively, transmitted or recorded for the frame T=1 shown in FIG. 10B, is data processed by using parameters for changing the quantizing characteristics so as to provide better image quality of luminance signals of the four blocks than color difference signals of the other two blocks. Transmitted or recorded for the frame T=2, is data processed by using parameters for changing the quantizing characteristics so as to provide better image quality of color difference signals of the two blocks than luminance signals of the other four blocks. In the above manner, two frames or more are transmitted or recorded.

Figure 10C:
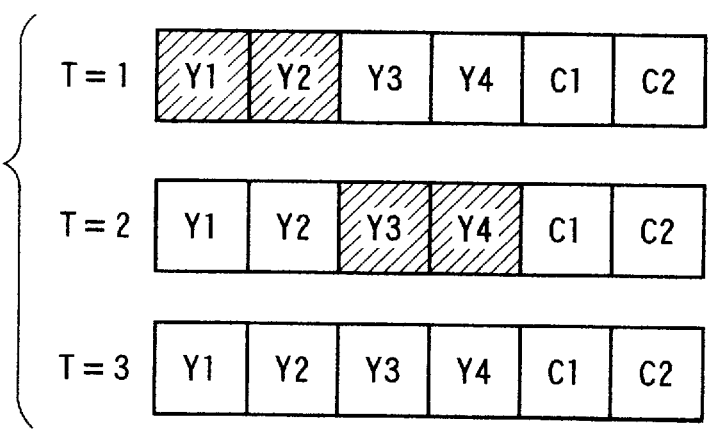

Alternatively, transmitted or recorded for the frame T=1 shown in FIG. 10C, is data processed by using parameters for changing the quantizing characteristics so as to provide better image quality of luminance signals of the two blocks among the four blocks than an image of the other four blocks. Transmitted or recorded for the frame T=2, is data processed by using parameters for changing the quantizing characteristics so as to provide better image quality of luminance signals of the other two blocks among the four blocks than an image of the other four blocks. Transmitted or recorded for the frame T=3, is data processed ordinarily (in the manner similar to when a moving image is recorded). In the above manner, three frames or more are transmitted or recorded.

Figure 11A:
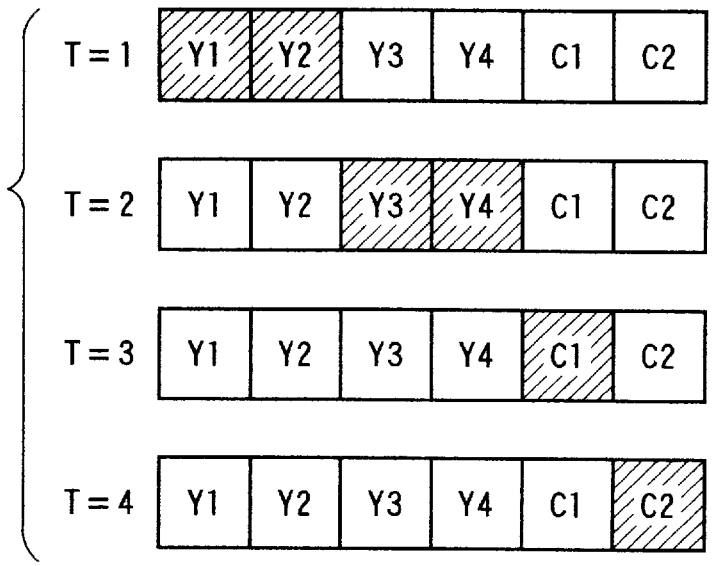
FIGS. 11A and 11B are diagrams illustrating a quantization operation by the apparatus shown in FIG. 1.

Alternatively, transmitted or recorded for the frame T=1 shown in FIG. 11A, is data processed by using parameters for changing the quantizing characteristics so as to provide better image quality of luminance signals of the two blocks among the four blocks than an image of the other four blocks. Transmitted or recorded for the frame T=2, is data processed by using parameters for changing the quantizing characteristics so as to provide better image quality of luminance signals of the other two blocks among the four blocks than an image of the other four blocks. Transmitted or recorded for the frame T=3, is data processed by using parameters for changing the quantizing characteristics so as to provide better image quality of color difference signals on one block among the two blocks than an image of the other five blocks. Transmitted or recorded for the frame T=4, is data processed by using parameters for changing the quantizing characteristics so as to provide better image quality of color difference signals on the other block among the two blocks than an image of the other five blocks. In the above manner, four frames or more are transmitted or recorded.

Figure 11B:
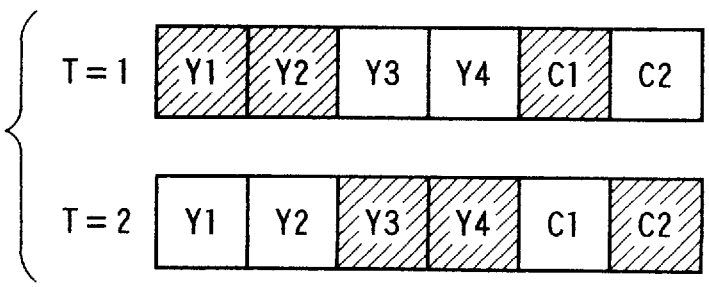
Figure 12A:
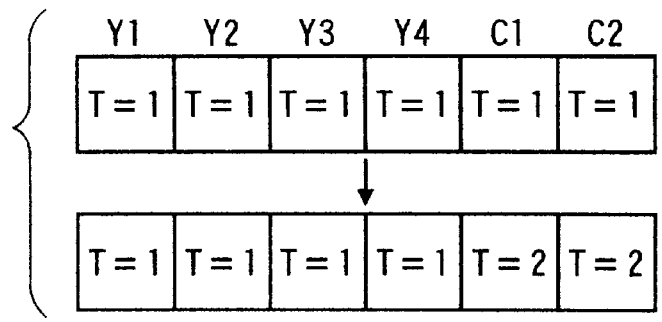
FIGS. 12A to 12C are diagrams illustrating a reproducing operation of the data quantized as shown in FIGS. 10A to 10C.
Figure 12B:
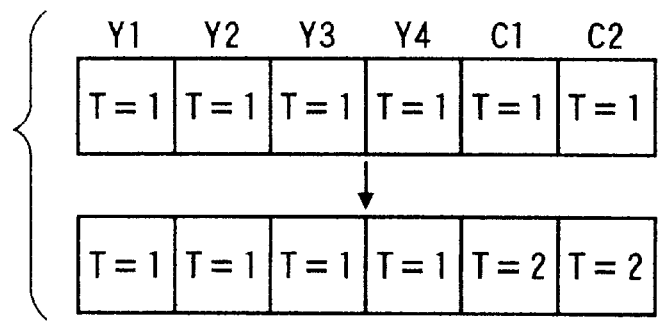
Figure 12C:
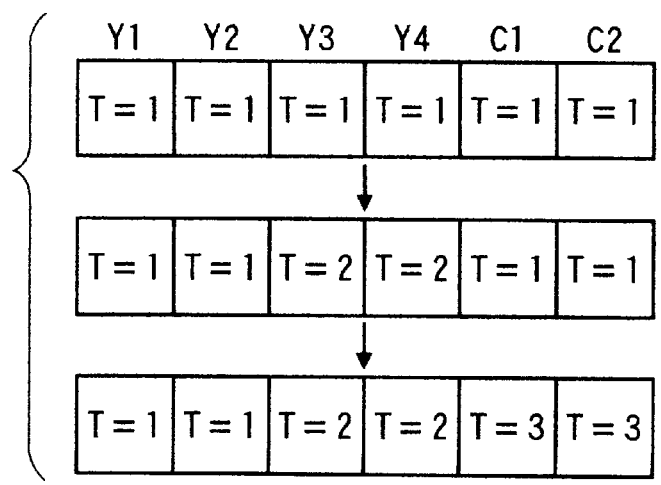
Figure 13A:
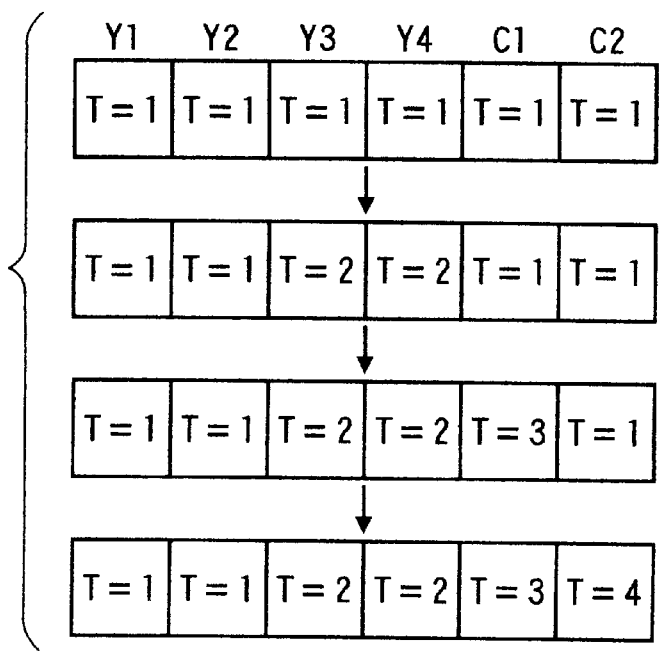
FIGS. 13A and 13B are diagrams illustrating a reproducing operation of the data quantized as shown in FIGS. 11A and 11B.
Figure 13B:
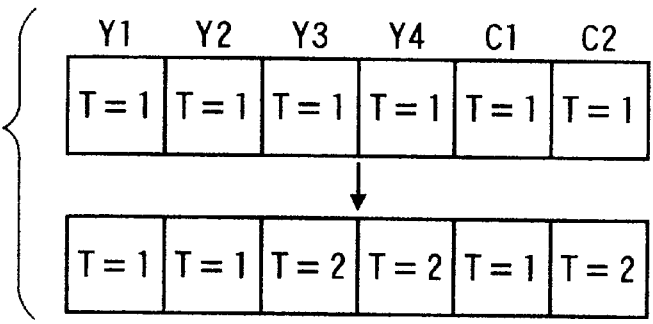

Alternatively, transmitted or recorded for the frame T=1 shown in FIG. 11B, is data processed by using parameters for changing the quantizing characteristics so as to provide better image quality of luminance signals of the two blocks and color difference signals of one block than an image of the other three blocks. Transmitted or recorded for the frame T=2, is data processed by using parameters for changing the quantizing characteristics so as to provide better image quality of luminance signals of the other two blocks and color difference signals of the other one block than an image of the other three blocks. In the above manner, two frames or more are transmitted or recorded.

In the above manner, X-block fixed-length encoding is executed in transmitting or recording a plurality of times the image data of the same frame as a still image.

An operation of reproducing the image data transmitted or recorded in the above manner will be described.

As described above, the image data of the blocks quantized based on with the quantizing characteristics with least degraded image quality is selected from each of the image data transmitted or recorded a plurality of times. By using such image data, the image data with least degraded image quality can be obtained.

In this embodiment, as described earlier, the memory 116 is controlled by the memory control unit 115 for the address control and read/write operation, and the memory control unit 115 receives the data S12 as the inverse quantization information used by the inverse quantizer 113. Therefore, writing to the memory 116 is controlled by using the data S12 as the inverse quantization information.

FIGS. 12A to 12C and FIGS. 13A and 13B show the state of image data shown in FIGS. 10A to 10C and FIGS. 11A and 11B stored in the memory 116. First, the image data of a frame of T=1 is written in the memory 116. The memory control unit 115 then controls to write image data of the succeeding frames in the following manner. Specifically, if the image data of the succeeding frame at one block quantized based on the quantizing characteristics with less degraded image quality than the image data of the first frame at the corresponding block already stored in the memory 116, is reproduced, the latter is replaced by the former, and the image data at the other blocks is not written. With this control, the image data of one frame with less image quality can be written in the memory 116.

In this embodiment, as described above, even if X blocks are constituted by blocks of luminance and color difference signals, it is possible to obtain image signals with less degraded image quality.

Another embodiment of the invention will be described. The structure of the apparatus used by this embodiment is also the same as that shown in FIG. 1.

In this embodiment, however, quantization which is the same as used for recording a moving image is executed also for a still image, without changing the quantizing characteristics so as to make a particular area in each frame have better image quality, as in the previously described embodiment.

Also in this embodiment, the image data of one frame stored in the memory 103 as a still image is repetitively read five times.

In this embodiment, the memory control unit 104 controls the read address of the memory 103 to divide the image data into blocks to be described in the following.

FIGS. 14A to 14E are diagrams showing examples of four types of block formations according to this embodiment.

Figure 14A:
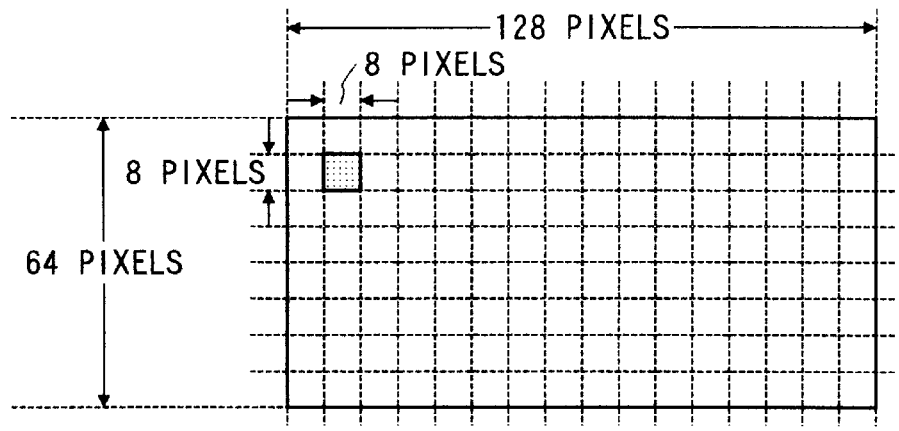
FIGS. 14A to 14E are diagrams illustrating another block formation by the apparatus shown in FIG. 1.

FIG. 14A illustrates an example of block formation in which a block is 8×8 pixels is formed starting from the upper left of the image signal without leaving any blank. The memory control unit 105 always executes this block formation when a moving image is recorded. With this block formation and orthogonal transform, a moving image can be processed quite the similar manner to conventional high efficiency coding such as digital VTR.

Figure 14B:
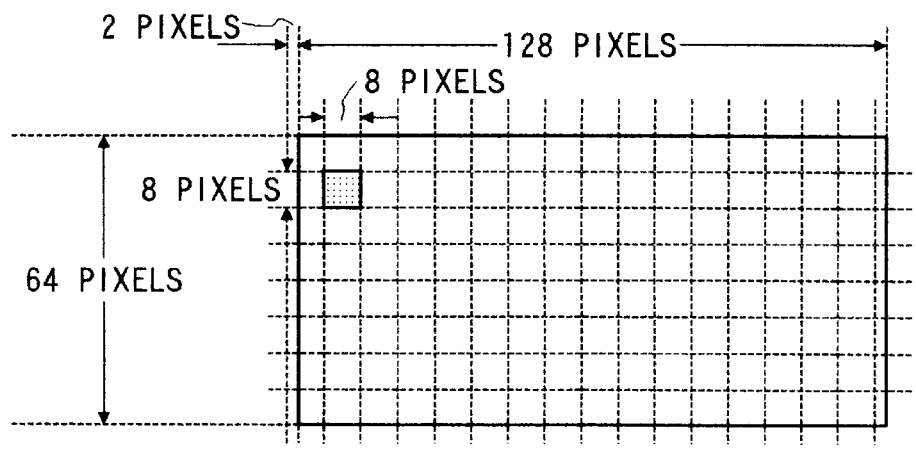
Figure 14C:
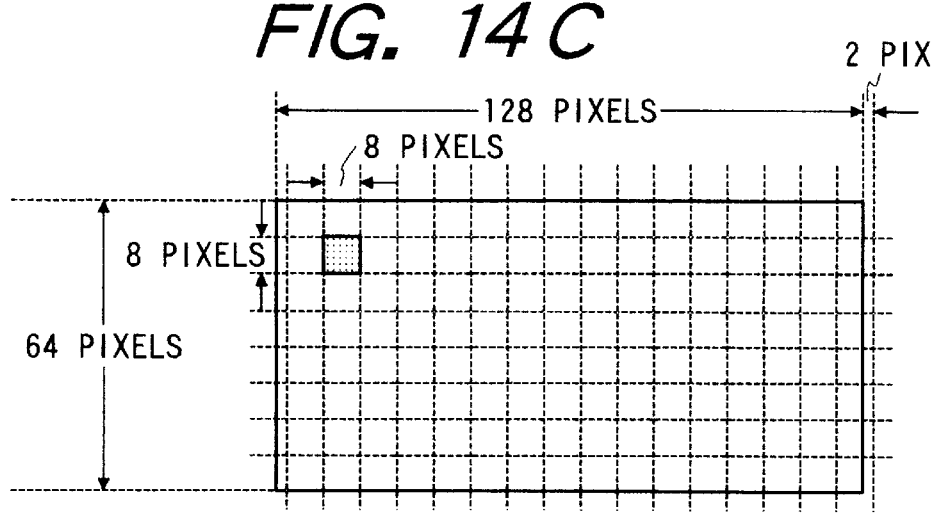
Figure 14D:
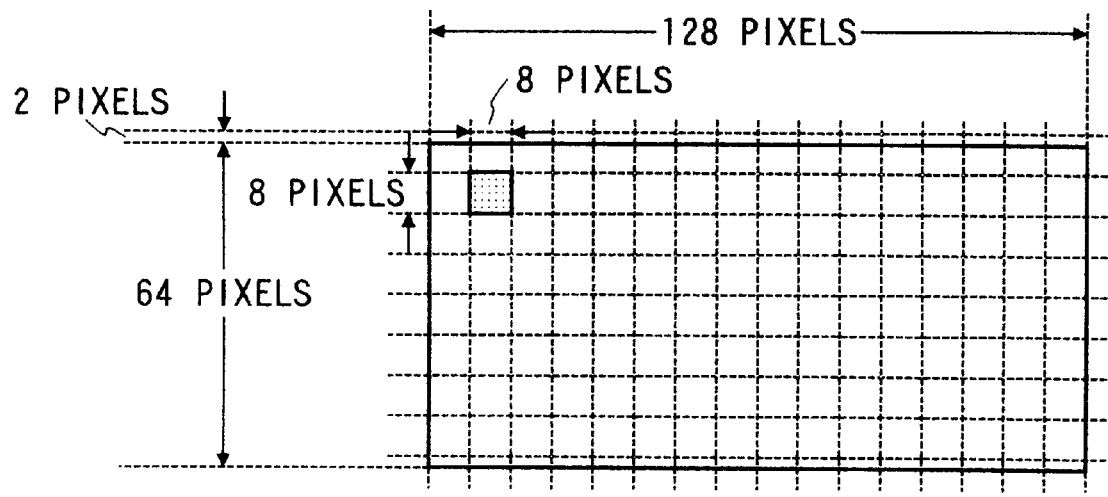
Figure 14E:
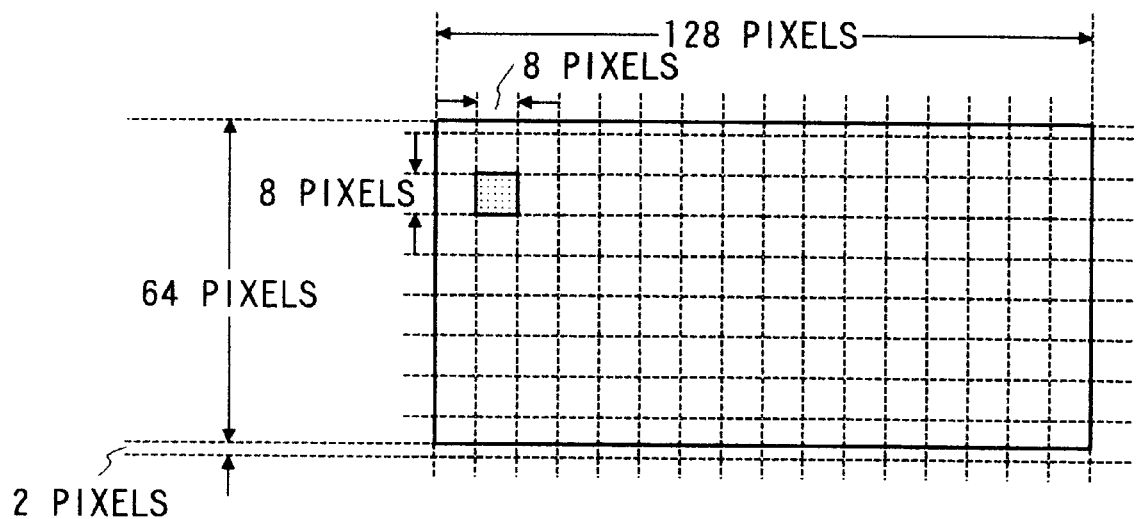

FIGS. 14B and 14C illustrate examples of block formation in which the image signal is shifted by two pixels to the right and left, respectively. FIGS. 14D and 14E illustrate examples of block formation in which the image signal is shifted by two pixels to the up and down. When a still image signal is input, a switch sequentially selects the block formation processes shown in FIGS. 14A to 14E for each of five frames. In this embodiment, therefore, images of five frames each shifted by two pixels are recorded in a magnetic medium as a single still image. If the blocks are formed as shown in FIG. 14B, four pixels are lost by two pixels at the right and left ends of a frame in the horizontal direction. Therefore, the two blocks (blocks a and b shown in FIG. 14A) at the right and left ends are processed as one block.

Figure 15:
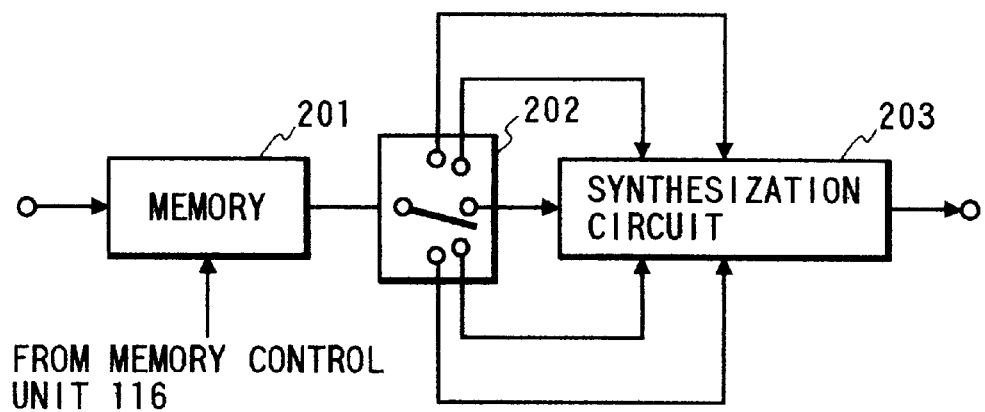
FIG. 15 is a diagram showing an example of the structure of a memory shown in FIG. 1.

Next, an operation of reproducing a still image recorded in the above manner will be described. FIG. 15 is a block diagram showing another structure of the memory 116 of the apparatus shown in FIG. 1.

Referring to FIG. 15, the image data subjected to inverse discrete cosine transform by the inverse orthogonal transform unit 114 is written in a memory 201. The memory control unit 115 outputs the image data stored in the memory 201 to a switch 202.

A switch 202 switches and outputs the image data from the memory 201 frame by frame.

A synthesization circuit 203 sequentially outputs supplied image data to the DAC 117, when a movie image signal is reproduced.

The synthesization circuit 203 is constituted by an adder, a memory, and a divider, and when the still image is reproduced, a still image of one frame is synthesized from the image data of five frames each shifted by two pixels, and output via an output terminal 205.

Since the image data of five frames each shifted by two pixels has different block boundaries, distortions at block boundaries are contained at different positions. Therefore, by averaging the image data of five frames aligned in position, distortions at the block boundaries can be reduced and an image of high quality can be synthesized.

In this embodiment, blocks are formed with and without shifting pixels by a predetermined number. Therefore, image data of the same frame can be divided into a plurality of blocks, and by subjecting each block to orthogonal transform, a plurality type of orthogonally transformed signals can be generated and output.

Further, the plurality type of orthogonally transformed signals are reproduced and synthesized to form a still image of one frame synthesized from a plurality type of still images.

Therefore, by executing averaging with position alignment when the plurality type of still images are synthesized into a still image of one frame, distortions at the block boundaries can be reduced and a still image of high quality can be obtained. Accordingly the distortions at block boundaries can be reduced without greatly changing high efficiency coding scheme of a moving image, and a still image of high quality can be obtained.

Figure 16:
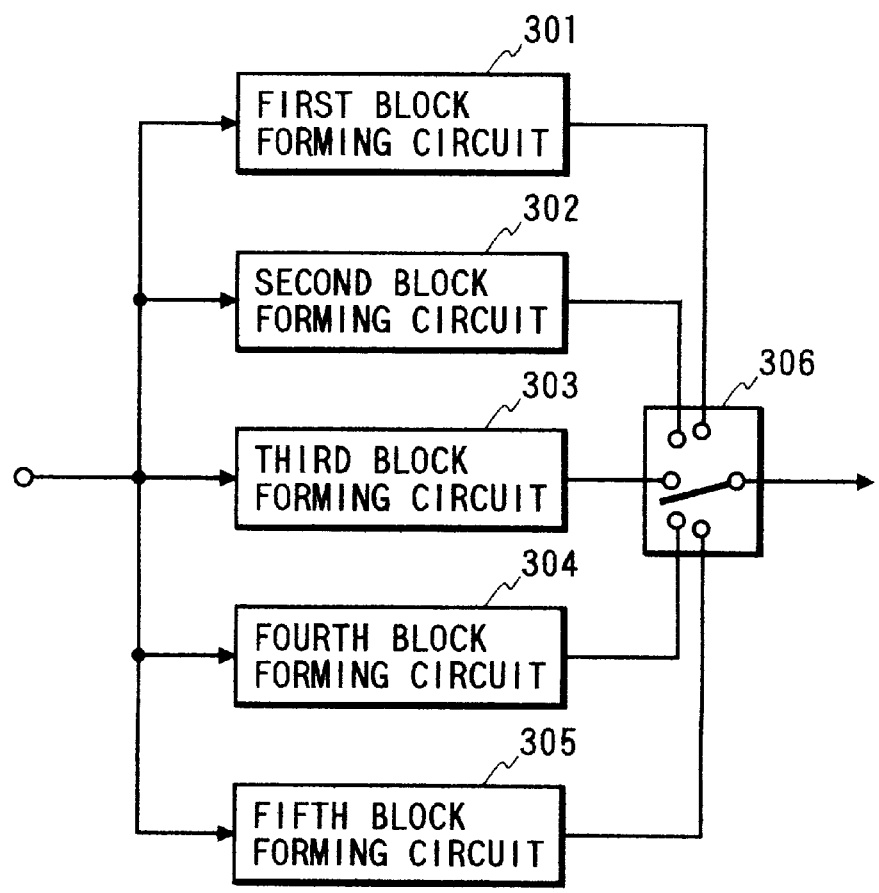
FIG. 16 is a diagram showing the structure of a block forming circuit according to the embodiment of the invention.

In this embodiment, although block formation is performed by controlling the read address of the memory 103 by the memory control unit 104, a block forming circuit 300 shown in FIG. 16, for example, may be used in place of the memory 103.

In FIG. 16, each block forming circuit 301 to 305 has a memory of one frame and performs block formation illustrated in FIGS. 14A to 14E to output image data to a switch 306.

The switch 306 is controlled by an unrepresented controller and when a moving image is recorded, only the output of the block forming circuit 301 is selected and output to the orthogonal transform unit 105.

When a still image is recorded, the image data of the same frame is supplied at the same time to each block forming circuit 301 to 305 and the switch 306 sequentially selects the outputs of the block forming circuits 301 to 305 and outputs the image data.

What is claimed is:

1. A recording apparatus, comprising:

memory means for storing image data of one frame having plural regions;

memory control means for controlling to read the image data repetitively from said memory means;

encoding means for encoding the image data of one frame stored in said memory means, wherein for one repetition of read-out from said memory means, said encoding means encodes so that image quality for one region of the plural regions is better than image quality for the remaining regions, and wherein for a subsequent repetition said encoding means encodes so that image quality for a different one of said plural regions is better than image quality for the remaining regions; and recording means for recording the image data encoded by said encoding means.

2. An apparatus according to claim 1, wherein said encoding means changes said one region.

3. An apparatus according to claim 1, further comprising:

reproducing means for reproducing the encoded image data for plural repetitions;

storing means for storing the image data reproduced by said reproducing means; and control means for controlling the storage operation of said storing means so as to select only the image data at the one region in each repetition that has been encoded to have a better image quality reproduced by said reproducing means, and to store only the selected image data in said storing means.

4. An apparatus according to claim 3, wherein said recording means also records encoding information indicating parameters used by said encoding means for encoding the image data, wherein said reproducing means also reproduces the encoding information, and wherein said control means controls the storage operation of said storing means in accordance with the encoding information reproduced by said reproducing means.

5. An apparatus according to claim 1, wherein said encoding means comprises:

block forming means for dividing the image data of one frame stored in said memory means into a plurality of blocks each including a plurality of pixels;

transforming means for orthogonally transforming the image data of the plurality of blocks;

quantizing means for quantizing the image data transformed by said transforming means by using quantizing coefficients; and variable length encoding means for variable-length encoding said image data quantized by said quantizing means, wherein said encoding means determines the quantizing coefficients such that the quality of an image for the one region is better than the image quality for the remaining regions.

6. An apparatus according to claim 5, wherein said encoding means extracts a predetermined number of blocks from each of the plural regions to form encoding blocks and encodes the image data so as to make the code amount of the encoding blocks fall within a predetermined range.

7. An apparatus according to claim 5, wherein the image data include luminance data and color difference data, and the plurality of blocks includes a plurality of luminance blocks of the luminance data having a plurality of pixels and a plurality of color blocks of the color data having a plurality of pixels.

8. A recording apparatus according to claim 1, wherein the one region is contiguous.

9. A recording apparatus according to claim 1, wherein the one region is non-contiguous.

10. A reproducing apparatus, comprising:

reproducing means for reproducing encoded image data that had previously been generated using an encoding process, said reproducing means further reproducing encoding parameters used for the encoding process that generated the encoded image data, said encoding parameters being associated with image quality of the encoded image data;

decoding means for decoding the reproduced encoded image data by using the encoding parameters reproduced by said reproducing means;

storing means for storing the image data decoded by said decoding means; and control means for selecting decoded image data to be stored into said storing means in accordance with the encoding parameters.

11. An apparatus according to claim 10, wherein said control means controls said storing means to store only a portion of the image data having a good image quality, in accordance with the encoding parameters.

12. An apparatus according to claim 11, wherein said image data includes a plurality of image data for one frame to be reproduced as a still image.

13. An apparatus according to claim 12, wherein each of the plurality of the image data for the frame is divided into a plurality of areas, and said control means controls said storing means to store only the image data having the best image quality at each of the plurality of areas among the plurality of the image data for the one frame.

14. An apparatus according to claim 13, wherein each of the plurality of the image data has been encoded such that the image data at a particular area among the plurality of areas has a better image quality than the other areas, and the particular area has been made to be different for each of the plurality of the image data for the one frame.

15. An apparatus according to claim 10, wherein each of the decoded image data of one frame is divided into a plurality of areas, and wherein said control means selects an area of the decoded image signal to be stored into said storing means from among the plurality of areas in accordance with the encoding parameters.

16. An encoding apparatus for repetitively reading a plurality of times same image data of one frame from a memory and for encoding the read image data, wherein the same image data of the one frame is divided into a plurality of areas, and the image data is encoded such that the image data at a particular area among the plurality of areas has a better image quality than the other areas, and wherein the particular area is changed in a subsequent repetition.

17. An apparatus according to claim 16, wherein each of the plurality of areas is divided into a plurality of blocks each having a plurality of pixels, a predetermined number of blocks are extracted from each of the plurality of areas to form encoding blocks, and the image data is encoded so as to make the code amount of the encoding blocks fall in a predetermined range.

18. An apparatus according to claim 17, wherein the image data is encoded so that the code amount of the image data at the particular area among the plurality of areas is larger than the image data at each of the other areas.

19. A recording apparatus, comprising:

blocking means for executing a plurality of blocking processes for same image data of one frame, wherein in each blocking process the image data of the one frame are divided into a plurality of blocks each having a same number of pixels as blocks formed in other said blocking processes, and wherein a different block boundary is used during each blocking process;

encoding means for encoding the blocked image data in units of blocks; and recording means for recording the image data encoded by said encoding means.

20. An apparatus according to claim 19, wherein said blocking means includes a memory for storing the image data of the one frame, the image data being read from the memory in units of blocks.

21. An apparatus according to claim 20, wherein said recording means records the image data of the one frame repetitively read from the memory a plurality of times as a still image, and said blocking means executes a different type of blocking process for each of the plurality of times.

22. An apparatus according to claim 21, further comprising:

reproducing means for reproducing the encoded image data;

decoding means for decoding the image data reproduced by said reproducing means; and generating means for generating the image data of the one frame by using a plurality of the image data of the one frame corresponding to the plurality of times and constituting the still image, among the image data decoded by said decoding means.

23. An apparatus according to claim 22, wherein said generating means includes synthesizing means for synthesizing the plurality of the image data.

24. A recording apparatus according to claim 19, wherein a blocking pattern for one of the blocking processes is offset relative to a blocking pattern for an other of the blocking processes.

25. A recording apparatus according to claim 24, wherein the offset is a fraction of a block dimension.

26. A recording apparatus, comprising:

encoding means for dividing input image data of one frame into a plurality of areas, each comprising a plurality of blocks each of which comprises a predetermined number of pixels, and encoding the input image data so as to make the code amount for a predetermined number of blocks fall within a predetermined range;

recording means for recording the image data encoded by said encoding means; and mode switching means for switching a mode of the apparatus between a plurality of modes, wherein the plurality of modes includes a moving image record mode for recording a moving image frame by said recording means and a still image record mode for recording a still image frame by said recording means, and wherein said encoding means encodes the image data such that a proportion of the code amount of the image data in a predetermined area among the plurality of areas to the code amount of the image data in each of the other areas is different between the moving image record mode and the still image record mode.

27. A transmitting apparatus for repetitively transmitting, a plurality of times, image data of one frame representing a same image, said transmitting apparatus comprising:

encoding means for encoding the image data of one frame to provide encoded image data divided into plural regions; and transmitting means for repetitively transmitting encoded image data from said encoding means to perform a plurality of repetitions of transmission, wherein for one repetition of transmission, said encoding means encodes so that image quality for one region of the plural regions is better than image quality for the remaining regions, and wherein for a subsequent repetition said encoding means encodes so that image quality for a different one of said plural regions is better than image quality for the remaining regions.

28. An apparatus according to claim 27, wherein the image data of one frame is stored in a memory, and wherein said transmitting apparatus reads the image data of one frame out of the memory separately for each repetition of transmission.

29. An image processing apparatus for receiving image data of one frame which are repetitively transmitted, from a transmission path, the image data of one frame being divided into a plurality of regions, for one repetition of transmission, the image data being processed so that image quality for one region of the plural regions is better than image quality of the remaining regions, and for a subsequent repetition the image data being processed so that image quality for a different one of the plural regions is better than image quality for the remaining regions, said image processing apparatus comprising:

receiving means for receiving the image data from the transmission path;

output means for outputting the image data received by said receiving means; and control means for controlling the output operation of said output means so as to select the image data processed to have a better image quality at the one region in each repetition, and to output the selected image data from said storing means.

30. An apparatus according to claim 29, wherein said output means comprises storage means for storing the image data received by said receiving means, said control means controlling a storage operation of said storage means so as to store only the selected image data in said storage means.

31. An apparatus according to claim 30, wherein the image data are encoded by using the parameter data.

32. An apparatus according to claim 29, wherein said receiving means further receives parameter data used for transmission processing of the image data, said control means controlling the output operation of said output means according to the parameter data.

33. An apparatus according to claim 29, further comprising reproducing means for reproducing control data representing the one region in each repetition at which the image data has been processed to have a better image quality.

34. An apparatus according to claim 29, wherein the image data are divided into a plurality of blocks each of which has a plurality of pixels, each of the plural regions comprising a plurality of the blocks.

35. An apparatus according to claim 29, wherein the transmission path comprises a recording medium.

* * * * *

UNITED STATES PATENT AND TRADEMARK OFFICE
CERTIFICATE OF CORRECTION

PATENT NO. : 5,953,456
DATED : September 14, 1999
INVENTOR(S) : SHINGO IKEDA ET AL.

It is certified that error appears in the above-identified patent and that said Letters Patent is hereby corrected as shown below:

COLUMN 8

Line 24, "with" (1st occurrence) should be deleted.

COLUMN 9

Line 6, "block is 8x8" should read --block containing 8x8--; and
Line 12, "quite" should read --in quite--.

COLUMN 12

Line 60, "an other" should read --another--.

Signed and Sealed this

Fifteenth Day of August, 2000

Attest:

Q. TODD DICKINSON

Attesting Officer

Director of Patents and Trademarks